US011582396B2

(12) United States Patent
Murakami

(10) Patent No.: US 11,582,396 B2
(45) Date of Patent: Feb. 14, 2023

(54) INFORMATION PROCESSING DEVICE, INFORMATION PROCESSING METHOD, AND RECORDING MEDIUM

(71) Applicant: CASIO COMPUTER CO., LTD., Tokyo (JP)

(72) Inventor: Taichi Murakami, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/195,047

(22) Filed: Mar. 8, 2021

(65) Prior Publication Data
US 2021/0306540 A1 Sep. 30, 2021

(30) Foreign Application Priority Data
Mar. 24, 2020 (JP) .............................. JP2020-052269

(51) Int. Cl.
*H04N 5/235* (2006.01)
*H05B 47/11* (2020.01)
*H04N 5/247* (2006.01)
*G06T 7/70* (2017.01)

(52) U.S. Cl.
CPC ............ *H04N 5/2351* (2013.01); *G06T 7/70* (2017.01); *H04N 5/247* (2013.01); *H05B 47/11* (2020.01)

(58) Field of Classification Search
None
See application file for complete search history.

(56) References Cited

U.S. PATENT DOCUMENTS

2020/0126267 A1\* 4/2020 Wu ...................... G06K 9/3216
2020/0160555 A1\* 5/2020 Mayer ....................... G06T 7/73

FOREIGN PATENT DOCUMENTS

| JP | 2012-93837 A | 5/2012 | |
| JP | 2017-28673 A | 2/2017 | |
| JP | 2017-101961 A | 6/2017 | |
| JP | 2017101961 A \* | 6/2017 | |
| WO | 2005/124687 A1 | 12/2005 | |
| WO | WO-2005124687 A1 \* | 12/2005 | ............. G06T 7/285 |

OTHER PUBLICATIONS

JPO; Application No. 2020-052269; Notice of Reasons for Refusal dated Feb. 1, 2022.

\* cited by examiner

*Primary Examiner* — James M Anderson, II
(74) *Attorney, Agent, or Firm* — Fitch, Even, Tabin & Flannery LLP

(57) ABSTRACT

An information processing device includes a picture image inputter configured to acquire a picture image imaged by a camera and at least one processor configured to execute a program stored in a memory. The at least one processor detects, from the picture image acquired by the picture image inputter, light emitted by a light-emission device, acquires, based on brightness of the detected light emitted by the light-emission device, set brightness information indicating an appropriate brightness for light to be emitted by the light-emission device, and transmits the acquired set brightness information to the light-emission device.

17 Claims, 10 Drawing Sheets

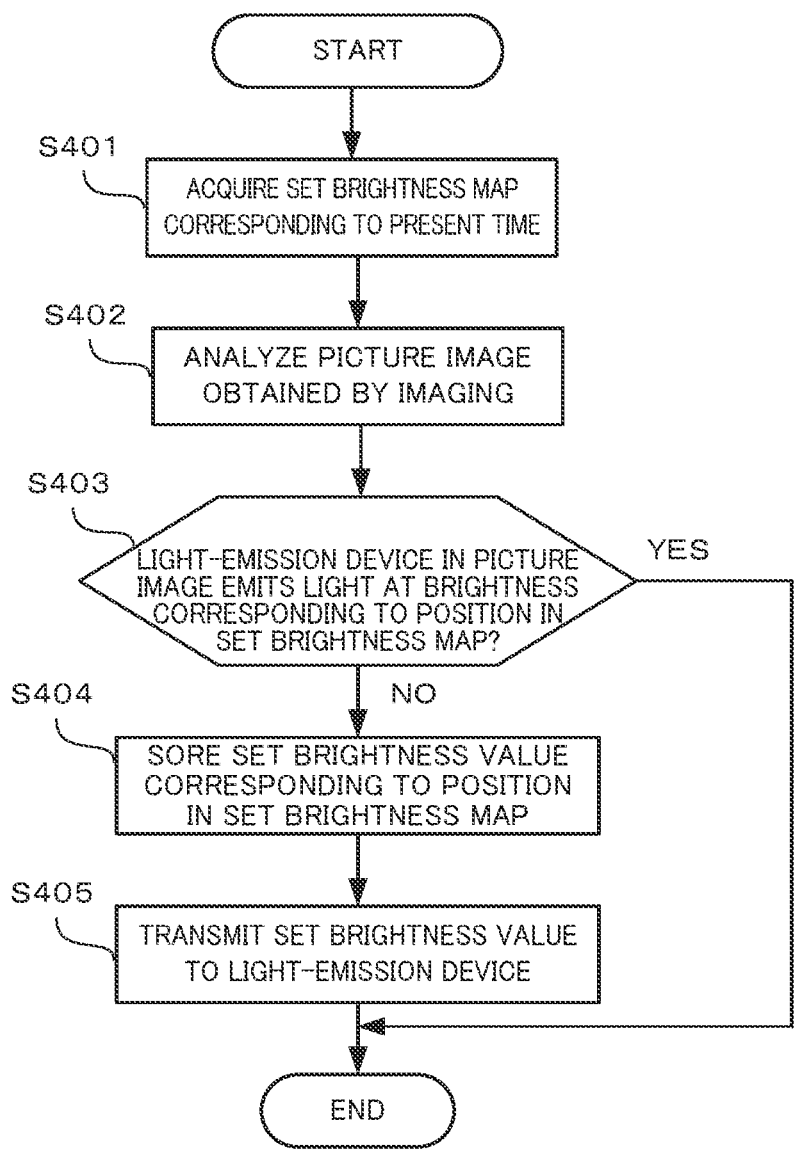

INFORMATION PROCESSING DEVICE, INFORMATION PROCESSING METHOD, AND RECORDING MEDIUM

CROSS-REFERENCE TO RELATED APPLICATION

This application claims the benefit of Japanese Patent Application No. 2020-052269, filed on Mar. 24, 2020, the entire disclosure of which is incorporated by reference herein.

FIELD

This application relates generally to an information processing device, an information processing method, and a recording medium.

BACKGROUND

Technology is mentioned in International Publication No. WO 2005/124687 in which multiple cameras image a marker that is a light source (transmitter) that emits light, and a three-dimensional position of the marker is determined.

However, the technology of the aforementioned International Publication No. WO 2005/124687 is sometimes unable to accurately measure the three-dimensional position of the marker due to excessive brightness of the marker caused by darkness in at the periphery of the marker, excessively low marker brightness caused by a bright periphery of the marker, or the like.

SUMMARY

In order to solve the aforementioned problem, an information processing device according to the present disclosure includes a picture image inputter configured to acquire a picture image imaged by a camera and at least one processor configured to execute a program stored in a memory. The at least one processor detects, from the picture image acquired by the picture image inputter, light emitted by a light-emission device, acquires, based on brightness of the detected light emitted by the light-emission device, set brightness information indicating an appropriate brightness for light to be emitted by the light-emission device, and transmits the acquired set brightness information to the light-emission device.

In order to solve the aforementioned problem, an information processing method according to the present disclosure includes acquiring a picture image imaged by a camera, detecting, from the acquired picture image, light emitted by a light-emission device, acquiring, based on brightness of the detected light emitted by the light-emission device, set brightness information indicating an appropriate brightness for light to be emitted by the light-emission device, and transmitting the acquired set brightness information to the light-emission device.

In order to solve the aforementioned problem, a non-transitory computer-readable recording medium according to the present disclosure records a program capable of execution by at least one processor of an information processing device. The program causes the at least one processor to acquire a picture image imaged by a camera, detect, from the acquired picture image, light emitted by a light-emission device, acquire, based on brightness of the detected light emitted by the light-emission device, set brightness information indicating an appropriate brightness for light to be emitted by the light-emission device, and transmit the acquired set brightness information to the light-emission device.

BRIEF DESCRIPTION OF THE DRAWINGS

A more complete understanding of this application can be obtained when the following detailed description is considered in conjunction with the following drawings, in which:

FIG. 10 is a flowchart illustrating an example of operation of the management device occurring in brightness control using the set brightness map according to the embodiment of the present disclosure.

DETAILED DESCRIPTION

As an information processing system according to an embodiment of the present disclosure, a visible light communication system is described below with reference to drawings.

Figure 1:
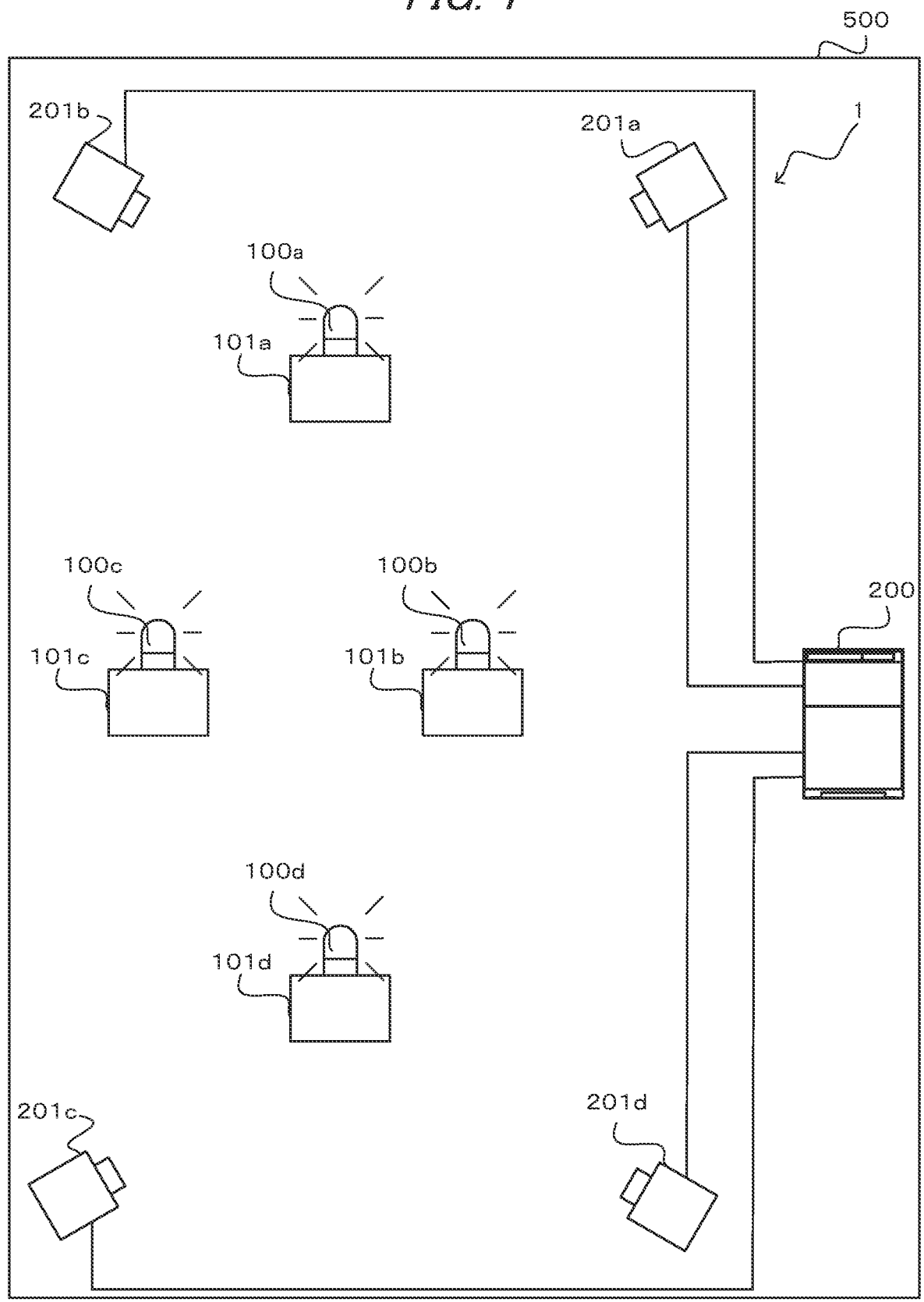
FIG. 1 illustrates an example of a visible light communication system according to an embodiment of the present disclosure.

FIG. 1 illustrates configuration of a visible light communication system 1. The visible light communication system 1 illustrated in FIG. 1 is configured to include (i) light-emission devices 100a, 100b, 100c, and 100d (referred to appropriately as "light-emission device 100" hereinafter without limitation to the individual cameras camera 100a, 100b, 100c, and 100d) arranged within a space 500, and (ii) a management device 200 corresponding to an information processing device. Various positions, that is, coordinates, in the space 500 are specified by an X axis and a Y axis that are mutually perpendicular and horizontally directed, and a Z axis that is vertically directed and perpendicular to both the X axis and the Y axis.

The light-emission device 100a is attached to a goods article 101a, the light-emission device 100b is attached to a goods article 101b, the light-emission device 100c is attached to a goods article 101c, and the light-emission device 100d is attached to a goods article 101d; and such goods articles are appropriately referred to collectively as a "goods article 101" hereinafter without limitation to the individual goods articles 101a, 101b, 101c, and 101d.

The management device 200 is a personal computer or server. Cameras 201a, 201b, 201c, and 201d corresponding to imaging means are attached to the management device 200, and are referred to appropriately as "camera 201" hereinafter without limitation to the individual cameras 201a, 201b, 201c, and 201d.

The light-emission device 100 and the management device 200 perform visible light communication. In the present embodiment, the light-emission device 100 transmits a light-emission device identification (ID) for identification by causing change in emitted light color in accordance with the light-emission device ID thereof.

The management device 200 stores beforehand, in association with each other, the light-emission device ID that is the identification information of the light-emission device 100 and information of the goods article 101 to which the light-emission device 100 is attached. The management device 200 receives the light-emission device ID by demodulation of changes in the color of light within a picture image obtained by time series-type sequential imaging by the camera 201. Moreover, the management device 200 can determine a position of the light-emission device 100 in a space 500 based on a position of the light-emission device 100 within a picture image obtained by imaging, and can determine a position of the goods article 101 in the space 500 based on the association between the light-emission device ID of the light-emission device 100 and the information of the goods article 101.

Figure 2:
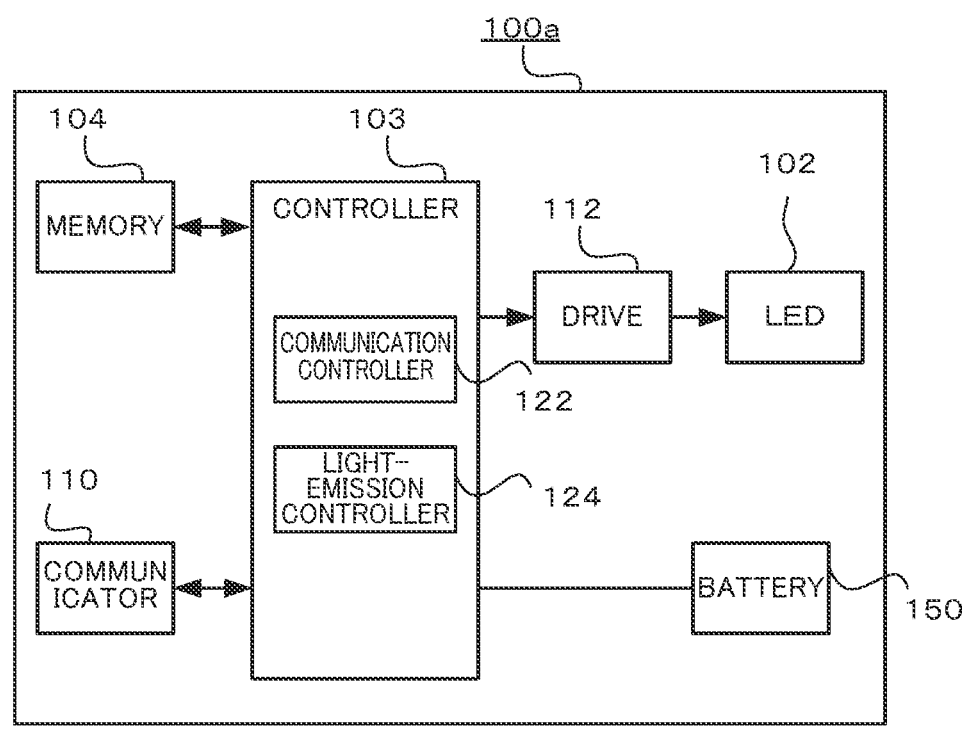
FIG. 2 illustrates an example of a light-emission device according to the embodiment of the present disclosure.

FIG. 2 illustrates an example configuration of the light-emission device 100a. As illustrated in FIG. 2, the light-emission device 100a includes a light-emitting diode (LED) 102, a controller 103, a memory 104, a communicator 110, a drive 112, and a battery 150. The light-emission devices 100b-100d are similarly configured.

The controller 103 is configured using a central processing unit (CPU), for example. The controller 103 controls various types of functions, provided for the light-emission device 100a, by executing software processing in accordance with programs stored in the memory 104.

The memory 104 is, for example, random access memory (RAM) and read only memory (ROM). The memory 104 stores various types of information such as programs used for functions such as control of the light-emission device 100a. The communicator 110 performs wireless communication with the management device 200, for example.

A communication controller 122 and a light-emission controller 124 are included in the controller 103. The communication controller 122 performs wireless communication via the communicator 110 with the management device 200, and receives from the management device 200 a set brightness value designating brightness during light emission by the LED 102.

The light-emission controller 124 outputs the set brightness value to the drive 112 such that the LED 102 emits light at the received set brightness value. Moreover, the light-emission controller 124 determines a light-emission pattern for causing time-sequential change in emitted light color corresponding to the light-emission device ID that is transmission information in accordance with visible light communication, and outputs to the drive 112 information of the light-emission pattern.

The drive 112 determines brightness of the LED 102 in accordance with the set brightness value from the light-emission controller 124. Moreover, the drive 112 generates, and outputs to the LED 102, a drive signal for causing time-wise change in the emitted light color of the LED 102 in accordance with the information of the light-emission pattern. The LED 102 emits light that changes time-wise in brightness in accordance with the set brightness value and in the emitted light color in accordance with the drive signal output from the drive 112. For example, the emitted light colors are the three primary colors, and the colors of the wavelength band used for color modulation in the visible light communication are red (R), green (G), and blue (B).

After start of the aforementioned light emission by the LED 102, the communication controller 122 transmits to the management device 200 via the communicator 110 light-emission notification information indicating that light is previously emitted at the set brightness value.

Figure 3:
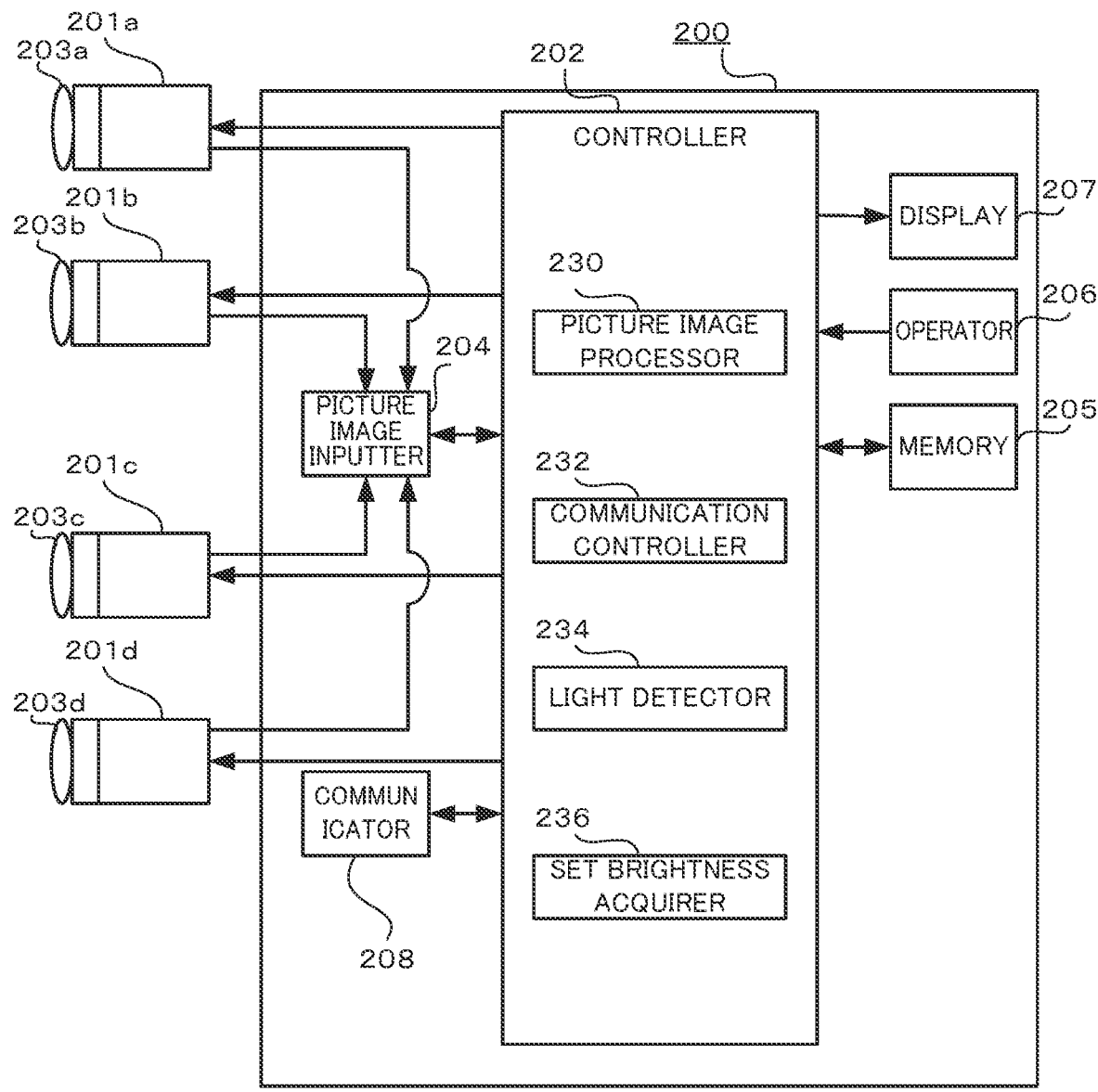
FIG. 3 illustrates an example of a management device according to the embodiment of the present disclosure.

FIG. 3 illustrates an example configuration of the management device 200. As illustrated in FIG. 2, the management device 200 includes the cameras 201a, 201b, 201c, and 201d, a controller 202, a picture image inputter 204, a memory 205, an operator 206, a display 207, and a communicator 208.

The camera 201a includes a lens 203a, the camera 201b includes a lens 203b, the camera 201c includes a lens 203c, and the camera 201d includes a lens 203d; and hereinafter, the lenses 203a, 203b, 203c, and 203d are collectively referred to appropriately as the "lens 203" without particular limitation to the respective lens. The lens 203 includes a zoom lens, for example. The lens 203 moves due to a zoom control operation from the operator 206 and due to focus control by the controller 202. The view angle and optical image imaged by the camera 201 are controlled via movement of the lens 203.

The cameras 201a-201d each include a light-receiving surface that includes light-reception elements arranged in a regular two-dimensional array. The light-reception elements are those of an imaging device such as a charge coupled device (CCD), a complementary metal oxide semiconductor (CMOS), or the like. The cameras 201a-201d each perform imaging (light reception) of the optical image formed by entrance of light through the lens 203 at the view angle of a prescribed range based on the control signal from the controller 202, and generates a frame by conversion of the picture image signal within the view angle into digital data. Moreover, the cameras 201a-201d each continue time-wise the imaging and frame generation, and successive frames are output to the picture image inputter 204 within the management device 200.

The controller 202 includes a processor such as a CPU, for example. The controller 202, by execution of software processing in accordance with programs stored in the memory 205, controls various functions with which the management device 200 is equipped.

Based on a control signal from the controller 202, the picture image inputter 204 receives as input the frame, that is, digital data, output from the camera 201.

The memory 205 is RAM or ROM, for example. The memory 205 stores various types of information, such as programs, used for control or the like occurring in the management device 200. Moreover, the memory 205 stores in association with each other (i) the light-emission device ID that is the identification information of the light-emission device 100 and (ii) the information of the goods article 101 to which the light-emission device 100 is attached. Furthermore, in the case in which the set brightness value is previously set for the light-emission device 100, the memory 205 stores in association with each other the set brightness value and the light-emission device ID of the light-emission device 100. Moreover, the memory 205 stores information of a set brightness map indicating set brightness occurring in each of various regions into which an XY plane is divided that is a horizontal plane defined by an X coordinate and a Y coordinate in the space 500.

The operator 206 includes a mouse, numeric keyboard keys, function keys, or the like, and is an interface to be used by a user for entry of operation content. The display 207, for example, includes a liquid crystal display (LCD), a plasma display panel (PDP), an electro-luminescence (EL) display, or the like. The display 207 displays the picture image in accordance with a picture image signal output from the controller 202. The communicator 208, based on control by a communication controller 232, performs wireless communication between the light-emission device 100 or the like and an external device.

The controller 202 includes a picture image processor 230, the communication controller 232, a light detector 234, and a set brightness acquirer 236.

The picture image processor 230 adjusts image quality and picture image size by performing peripheral darkening correction and distortion correction to allow display as a through image on the display 207 of the frame, that is, digital data, output from the camera 201 and input to the picture image inputter 204. Moreover, the picture image processor 230 has a function for, upon inputting of the control signal based on the command operation from the operator 206, producing a file by using a compression encoding format such as that of the Join Photographic Experts Group (JPEG) to encode an optical image within a view angle of the camera 201 when recording is ordered, or alternatively, within a display range for display on the display 207.

The communication controller 232 specifies the light-emission device 100 one at a time, and reads from the memory 205 the set brightness value corresponding to the specified light-emission device 100. Furthermore, the communication controller 232 transmits the set brightness value by wireless communication via the communicator 208 to the specified light-emission device 100.

After transmission of the set brightness value, in the aforementioned manner, for the light-emission device 100, the light-emission controller 124 within the controller 103 controls the LED 102 so as to emit light at the set brightness value, and the LED 102 emits light that changes time-wise in the emitted light color in accordance with the light-emission device ID and at the brightness corresponding to the set brightness value. Furthermore, after the start of light emission by the LED 102, the communication controller 122 within the controller 103 transmits to the management device 200, by wireless communication via the communicator 110, the light-emission notification information indicating to the effect that light is previously emitted at the set brightness value.

The communication controller 232 receives, via the communicator 208, the light-emission notification information to the management device 200.

Upon reception of the light-emission notification information, the light detector 234 performs picture image analysis, and detects, as a position (two-dimensional position) of an image of the light-emission device 100 (LED 102), a position having a brightness of at least a prescribed value in each picture image obtained by imaging by the cameras 201a-201d. Furthermore, the light detector 234 attempts to demodulate the light-emission device ID corresponding to the light-emission pattern occurring at the position of the light-emission device 100. Furthermore, the light detector 234 specifies a position, that is, a three-dimensional position, of the light-emission device 100 occurring in the space 500 per a known method, based on the two-dimensional position of the image of the light-emission device 100 corresponding to the light-emission device ID that is identical in various picture images obtained by imaging by at least two of the cameras 201.

The set brightness acquirer 236 performs set brightness map generation and brightness control. The set brightness map generation and brightness control are performed appropriately in accordance with increase or decrease in the number of the light-emission devices 100, or the like. Firstly, the set brightness acquirer 236 determines whether the light-emission device 100 within the picture image is emitting light at the appropriate brightness. Specifically, if a value, obtained by subtracting a luminosity value of a periphery (background) of the light-emission device 100 from a brightness value of the light-emission device 100 occurring within the picture image, is positive and is within a prescribed range, the set brightness acquirer 236 determines that the light-emission device 100 is emitting light at the appropriate brightness, and if the value is less than a prescribed value or is outside the prescribed range, determines that the light-emission device 100 is not emitted light at the appropriate brightness. Such operation is used since, although the luminosity value of the light-emission of the light-emission device 100 is required to be higher than the luminosity value of the background in order to specify the position of the light-emission device 100, phenomena occur such as so-called overexposure when luminosity is overly bright relative to the background luminosity value, and specification of the emitted light color becomes difficult.

Furthermore, when multiple cameras 201 image a single light-emission device 100, due to differences in the imaging direction of each of the cameras 201, the luminosity values of the backgrounds of the light-emission devices 100 occurring within the picture images obtained by the imaging of each of the cameras 201 differ. In such a case, an average value of the luminosity values of the backgrounds of the light-emission device 100 occurring within the picture images obtained by the imaging of the multiple cameras 201 may be used, or a highest luminosity value may be used as the luminosity value of the background.

Upon determination that the light-emission device 100 within the picture image is emitting light at the appropriate brightness, the set brightness acquirer 236 determines that the set brightness value transmitted by the communication controller 232 to the light-emission device 100 is an appropriate value, and causes the set brightness value to be recorded in the memory 205 in association with the light-emission device ID of the light-emission device 100.

Moreover, the set brightness acquirer 236 generates or updates information of the set brightness map indicating a set brightness occurring in respective regions of division of the XY plane in the space 500. The set brightness map is set for each of multiple time slots into which one day is divided. The set brightness acquirer 236 generates or updates, and stores in the memory 205, the set brightness map of the time slot that includes the present time.

Specifically, the set brightness acquirer 236 specifies the position in the XY plane where the light-emission device 100 is present, based on the three-dimensional position of the light-emission device 100 occurring in the space 500. Furthermore, the light detector 234 sets, to a set brightness value determined to be appropriate, brightness of the region, in the set brightness map, including the position on the XY plane where the light-emission device 100 is present. The information of the set brightness map stored in the memory 205 includes (i) information specifying the positions of each of the regions and (ii) the brightness value corresponding to each region.

Figure 4:
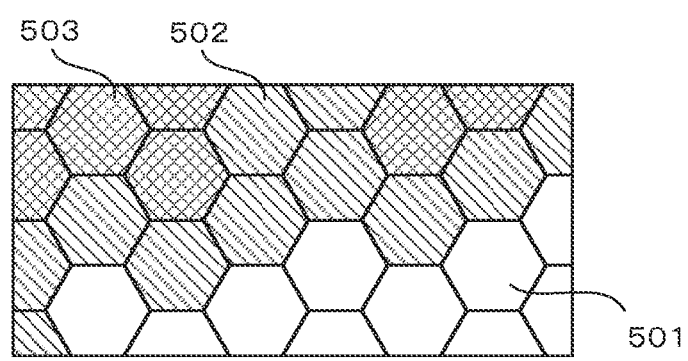
FIG. 4 illustrates a first example of a set brightness map according to the embodiment of the present disclosure.
Figure 5:
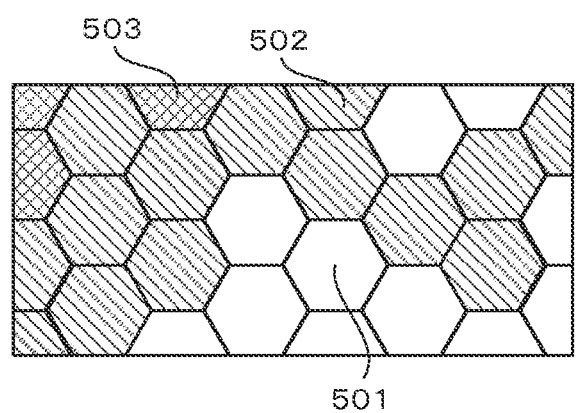
FIG. 5 illustrates a second example of the set brightness map according to the embodiment of the present disclosure.
Figure 6:
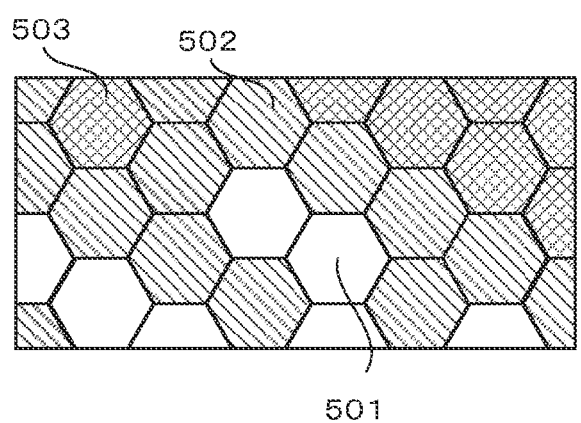
FIG. 6 illustrates a third example of the set brightness map according to the embodiment of the present disclosure.

FIG. 4 through FIG. 6 illustrate time-wise transitions in the set brightness map. In FIGS. 4-6, the XY plane in the space 500 is divided into hexagonal regions, each of the regions has three levels of set brightness, and each of the regions becomes a low brightness region 501, an intermediate brightness region 502, or a high brightness region 503. Furthermore, the regions into which the XY plane are divided in the space 500 are not limited to the hexagonal shape, and the user of the management device 200 can, in accordance with shape of the space 500 or the like, freely select a shape such as a triangular shape, square shape, or the like polygonal shape, or a circular shape, or the like. Moreover, the freely-selected shape selected at this time may be a combination of shapes of multiple types, such as triangular shapes and circular shapes, or the like. Moreover, the set brightness of each region occurring in the set brightness map is not limited to three levels, and the number of levels may be set by the user to a freely-selected number.

Moreover, the set brightness acquirer 236 performs brightness control using the set brightness map. The brightness control using the set brightness map, for example, is performed appropriately due to movement of the light-emission device 100. Firstly, the set brightness acquirer 236 acquires from the memory 205 the set brightness map corresponding to the present time, that is to say, the set brightness map corresponding to the time slot that includes the present time.

Next, the set brightness acquirer 236 determines whether the light-emission device 100 is emitting light at the brightness corresponding to the position in the set brightness map. Specifically, from the three-dimensional position of the light-emission device 100 in the space 500, the set brightness acquirer 236 determines the position in the XY plane where the light-emission device 100 is present. Moreover, the set brightness acquirer 236 determines the brightness value of the light-emission device 100 from the luminosity value of the light-emission device 100 within the picture image. Furthermore, the set brightness acquirer 236 determines, among the various regions of the set brightness map, the region that includes the position in the XY plane where the light-emission device 100 is present, and acquires the brightness value of the region.

Furthermore, in the case in which the difference between the brightness value of the light-emission device 100 and the brightness level of the region including the position of the light-emission device 100 in the set brightness map is within the prescribed range, the set brightness acquirer 236 determines that the light-emission device 100 in the picture image is emitting light at the brightness corresponding to the position in the set brightness map.

However, in the case in which the difference between the brightness value of the light-emission device 100 and the brightness level of the region including the position of the light-emission device 100 in the set brightness map is outside the prescribed range, the set brightness acquirer 236 determines that the light-emission device 100 in the picture image is not emitting light at the brightness corresponding to the position in the set brightness map.

In the case in which the light-emission device 100 is not emitting light at the brightness corresponding to the position in the set brightness map, the set brightness acquirer 236 determines, as a new set brightness value of the light-emission device 100, the brightness value of the region that includes the position of the light-emission device 100 in the set brightness map, and causes storage in memory 205 of the brightness value in association with the light-emission device ID of the light-emission device 100.

The communication controller 232 transmits to the light-emission device 100 the new set brightness value by wireless communication via the communicator 208.

After the transmission of the set brightness value, similarly to the aforementioned manner, the light-emission controller 124 within the controller 103 performs control of the light-emission device 100 such that the LED 102 emits light at the new set brightness value, and such that the LED 102 emits light that varies time-wise in the emitted light color in accordance with the light-emission device ID and at the brightness corresponding to the new set brightness value. Furthermore, after the start of light emission by the LED 102, the communication controller 122 within the controller 103 transmits to the management device 200 by wireless communication via the communicator 110 the light-emission notification information indicating to the effect that light is emitted at the set brightness value.

Figure 7:
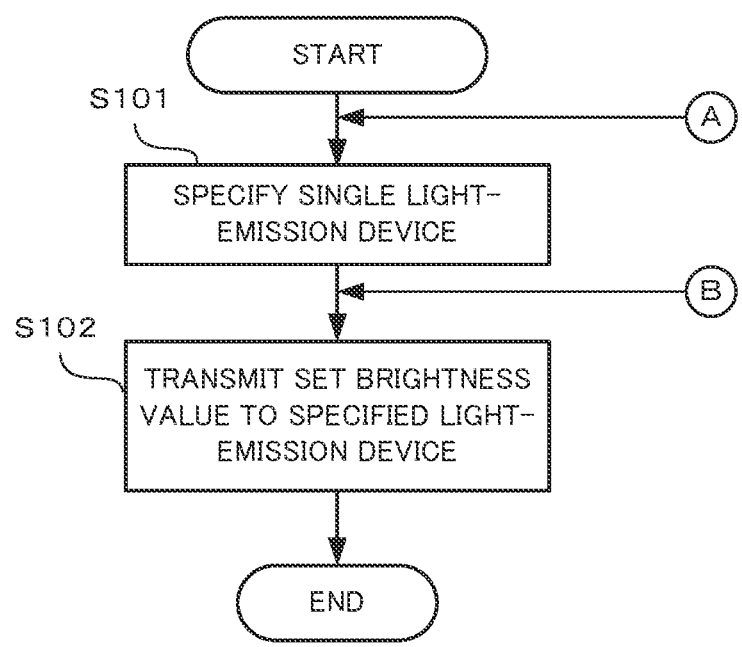
FIG. 7 is a flowchart illustrating an example of a first operation of the management device occurring in set brightness map generation and brightness control according to the embodiment of the present disclosure.

Next, operations are described with reference to flowcharts. FIG. 7 is a flowchart illustrating an example of a first operation of the management device 200 in the set brightness map generation and brightness control.

The communication controller 232 within the controller 202 specifies one of the light-emission devices 100 (step S101). Thereafter, the communication controller 232 reads from the memory 205 the set brightness value corresponding to the specified light-emission device 100, and transmits the set brightness value by wireless communication via the communicator 208 to the light-emission device 100 (step S102).

Figure 8:
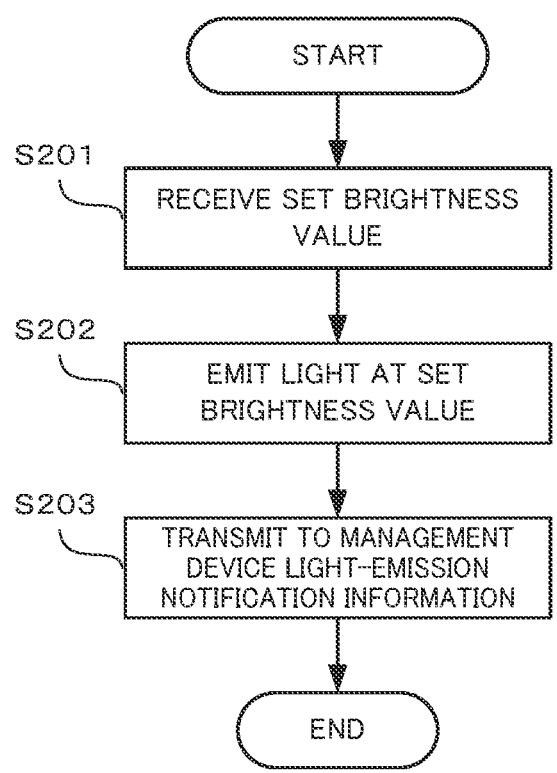
FIG. 8 is a flowchart illustrating an example of operation of the light-emission device occurring in set brightness map generation and brightness control according to the embodiment of the present disclosure.

FIG. 8 is a flowchart illustrating an example of operation of the light-emission device 100 during set brightness map generation and brightness control. The communication controller 122 within the controller 103 receives, via the communicator 110, the set brightness value from the management device 200 (step S201).

Next, the light-emission controller 124 performs control that causes light emission by the LED 102 at the received set brightness value (step S202). Via the light emission of the LED 102, the light-emission device ID is transmitted by visible light communication. Furthermore, the light-emission controller 124 transmits to the management device 200 via the communicator 110 the light-emission notification information indicating to the effect that light is previously emitted at the set brightness value (step S203).

Figure 9:
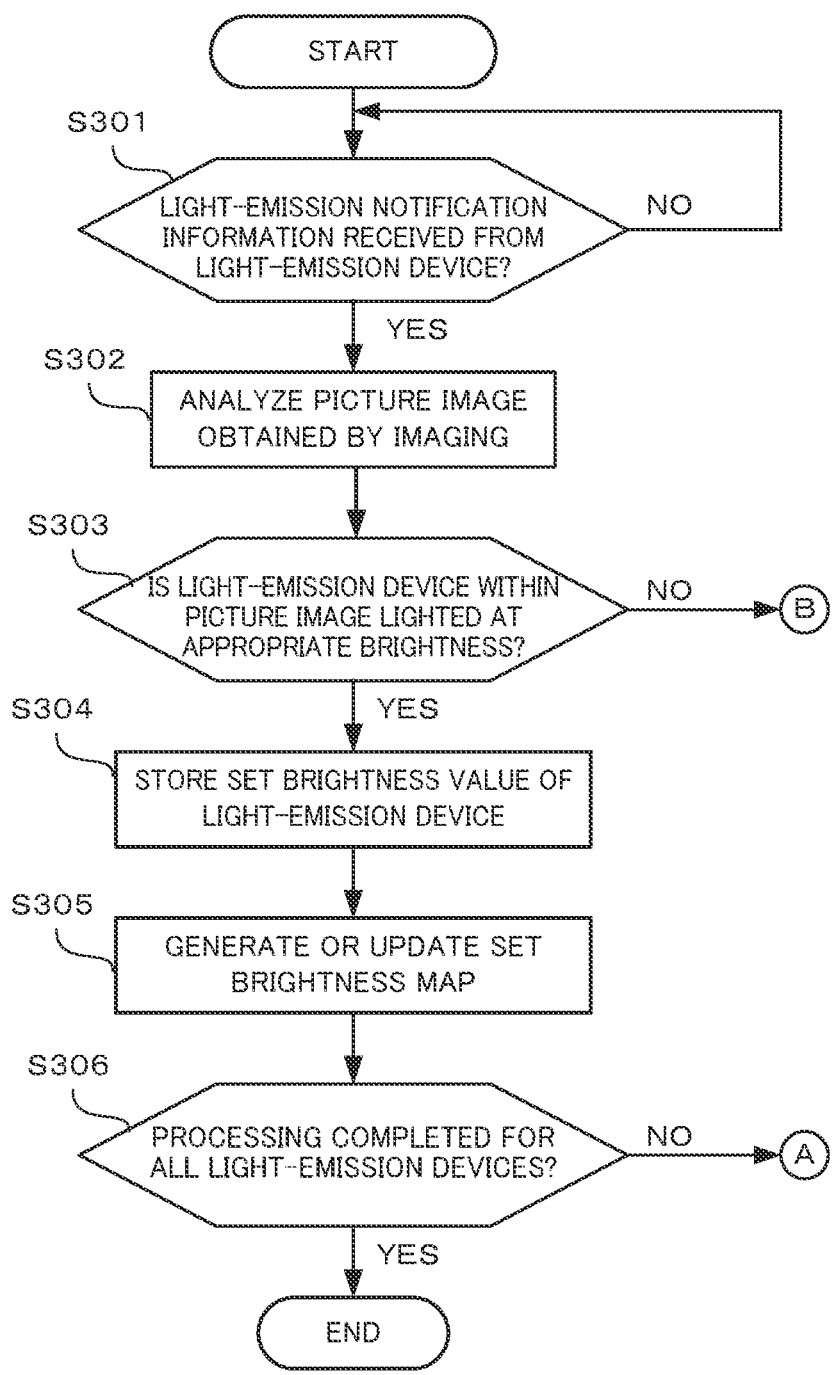
FIG. 9 is a flowchart illustrating an example of a second operation of the management device occurring in set brightness map generation and brightness control according to the embodiment of the present disclosure.

FIG. 9 is a flowchart illustrating an example of a second operation of the management device 200 in the set brightness map generation and the brightness control.

The picture image processor 230 within the controller 202 determines whether the light-emission notification information is received via the communicator 208 from the light-emission device 100 (step S301). The processing of step S301 is repeated until reception of the light-emission notification information.

In the case of prior reception of the light-emission notification information (YES in step S301), the light detector 234 performs analysis of the picture image obtained by imaging by the camera 201 (step S302). The picture image analysis results in acquisition of the two-dimensional position of the light-emission device 100 occurring within the picture image, acquisition of the light-emission device ID, and specification of the three-dimensional position of the light-emission device 100 occurring in the space 500.

Thereafter, the set brightness acquirer 236 determines whether the light-emission device 100 within the picture image is lighted at the appropriate brightness (step S303). In the case in which the light-emission device 100 is not emitting light at the appropriate brightness (NO in step S303), the step S102 operation of FIG. 7 is performed again. When the brightness is low in step S102, the set brightness acquirer 236 selects a new set brightness value that is higher than the present set brightness value, and performs control to send the new set brightness value to the light-emission device 100. However, when the brightness is high, the set brightness acquirer 236 selects a new set brightness value that is lower than the present set brightness value, and performs control to send the new set brightness value to the light-emission device 100.

However, in the case in which the light-emission device 100 is emitting light at the appropriate brightness (YES in step S303), determination is made that the set brightness value transmitted to the light-emission device 100 in step S102 of FIG. 7 is an appropriate value, and such set brightness value is stored in the memory 205 in association with the light-emission device ID of the light-emission device 100 (step S304).

Thereafter, the set brightness acquirer 236, based on the set brightness value and the three-dimensional position of the light-emission device 100, generates or updates the set brightness of the region that includes the position of the light-emission device occurring in the set brightness map, thereby generating or updating the information of the set brightness map (step S305).

Thereafter, the set brightness acquirer 236 determines whether, for all the light-emission devices 100, the processing of step S102 illustrated in FIG. 7 and steps S301 through S305 illustrated in FIG. 9 is completed (step S306). If all such processing for the light-emission devices 100 is completed (YES in step S306), the series of processing steps ends. However, if a light-emission device 100 exists for which the processing is not completed (NO in step S306), the processing of step S101 of FIG. 7 and beyond is repeated.

FIG. 10 is a flowchart illustrating an example of operation of the management device 200 occurring in the brightness control using the set brightness map. The set brightness acquirer 236 within the controller 202 acquires from the memory 205 the set brightness map corresponding to the present time (step S401).

Thereafter, the light detector 234 performs analysis of the picture image obtained by imaging by the camera 201 (step S402). Due to the picture image analysis, the light-emission device ID and the two-dimensional position of the image of the light-emission device 100 occurring in the picture image are acquired, and the three-dimensional position of the light-emission device 100 occurring in the space 500 is specified.

Thereafter, the set brightness acquirer 236 determines whether the light-emission device 100 is emitting light at the brightness that corresponds to the position in the set brightness map (step S403). If the light-emission device 100 is emitting light at the brightness corresponding to the position in the set brightness map (YES in step S403), the series of processing steps ends.

However, if the light-emission device 100 is not emitting light at the brightness corresponding to the position in the set brightness map (NO in step S403), the set brightness acquirer 236 determines, as a new set brightness value of the light-emission device 100, the brightness value of the region including the position of the light-emission device 100 in the brightness map, and causing storage of such in the memory 205 in association with the light-emission device ID of the light-emission device 100 (step S404).

Thereafter, the communication controller 232 transmits the new set brightness value by wireless communication via the communicator 208 to the light-emission device 100 (step S405). Processing similar to that of FIG. 8 is performed by the light-emission device 100 that receives the new set brightness value.

In this manner according to the present embodiment, in the set brightness map generation and the brightness control, the management device 200 transmits the set brightness value to the light-emission device 100 by wireless communication, and the light-emission device 100 emits light at the received set brightness value. Furthermore, the management device 200, based on the luminosity value of the light-emission device 100 occurring in the picture image obtained by imaging, determines whether the light-emission device 100 is lighted at the appropriate brightness, and if the lighting is at the appropriate brightness, stores the transmitted set brightness value and generates or updates the set brightness map. However, if the lighting is not at the appropriate brightness, the management device 200 uses wireless communication to transmit to the light-emission device 100 the new set brightness value that is regarded as the appropriate brightness, and causes the light-emission device 100 to emit light at such new set brightness value.

Moreover, in the brightness control using the set brightness map in the present embodiment, the management device 200 determines whether the light-emission device 100 is emitting light at the brightness corresponding to the position in the set brightness map. Then if light is not being emitted at the brightness corresponding to the position in the set brightness map, the management device 200 stores the new brightness value corresponding to the position in the set brightness map, transmits the new set brightness value to the light-emission device 100 by wireless communication, and causes the light-emission device 100 to emit light at such new set brightness value.

Due to such operation, the light-emission device 100 can emit light of the appropriate brightness, and the measurement accuracy of the three-dimensional position of the light-emission device 100 can be improved. Moreover, setting of the appropriate brightness prevents the emission of light that is unnecessarily highly bright by the light-emission device 100 and enables a decrease in the battery 150 energy consumption within the light-emission device 100.

Moreover, the set brightness value of the light-emission device 100 is stored and can be used thereafter for light emission control. Further, by generating the set brightness map and thereafter using such for light emission control, light emission control can be performed at a brightness corresponding to the position of the light-emission device 100.

Moreover, use of the set brightness map for light emission control corresponding to the time slot enables setting of the appropriate brightness in accordance with external lighting conditions, lighting conditions of illumination in the space 500, or the like and changes in brightness of the periphery.

Furthermore, the present disclosure is not limited to the aforementioned description and drawings of embodiments, and modifications can be appropriately added to the aforementioned embodiments and drawings.

For example, in the aforementioned embodiment, initially the management device 200 transmits the set brightness value by wireless communication to the light-emission device 100, and light emission is performed that corresponds to the set brightness value received by the light-emission device 100. However, such configuration is not limiting, and the light-emission device 100 may be configured to emit light that varies autonomously in brightness at each of prescribed times. In this case, the light-emission device 100 transmits to the management device 200 by wireless communication the set brightness value each time there is a change in the brightness value, that is, the set brightness value. The management device 200 receives the set brightness value. Furthermore, in the case in which the light-emission device 100 is not lighted at the appropriate brightness, the management device 200, (i) if the brightness is low, determines the set brightness value higher than the set brightness value received from the light-emission device 100 and then transmits such by wireless communication to the light-emission device 100, and (ii) if the brightness is high, determines the set brightness value lower than the set brightness value received from the light-emission device 100 and then transmits such by wireless communication to the light-emission device 100. The light-emission device 100 having received the set brightness value from the management device 200 emits light at the brightness corresponding to the received set brightness value.

Moreover, although the light-emission device 100 in the aforementioned embodiment transmits the light-emission notification information to the management device 200 by wireless communication, such processing may be omitted.

Moreover, although the set brightness map corresponding to the time slot is prepared in the aforementioned embodiment, preparation is permissible of just a single set brightness map that is updateable.

Moreover, the management device 200 may be any device with an attached camera 201.

Moreover, in the aforementioned embodiments, a program for execution may be stored and distributed on a computer readable recording medium such as a flexible disc, a compact disc read-only memory (CD-ROM), a digital versatile disc (DVD), a magneto-optical (MO) disc, or the like, and the system for executing the above processing may be formed by installation of such a program.

Moreover, the program may be stored beforehand on a disc device or the like included in the management device on a network such as the Internet, and may be superimposed on a carrier wave, for example, and then downloaded or the like.

Furthermore, in the case of achievement of the aforementioned functions by allocation to the operating system (OS), or achievement in cooperation between the OS and an application, or the like, the non-OS portion itself may be stored in a medium for distribution, downloading, or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information processing device comprising:
   a picture image inputter configured to acquire a picture image imaged by a camera; and
   at least one processor configured to execute a program stored in a memory, wherein
   the at least one processor
      from the picture image acquired by the picture image inputter, detects light emitted by a light-emission device and acquires a position of the light in the picture image,
      acquires, based on (i) brightness of the detected light emitted by the light-emission device, (ii) the acquired position of the light, and (iii) a pre-generated set brightness map indicating set brightness information for each of regions in the picture image that are divisions having a predetermined shape that is previously set, set brightness information indicating an appropriate brightness at the position for light to be emitted by the light-emission device, and
      transmits the acquired set brightness information to the light-emission device.

2. The information processing device according to claim 1, wherein
   the at least one processor causes storage of the acquired set brightness information in the memory.

3. The information processing device according to claim 1, wherein
   in the acquisition of the set brightness information, the at least one processor generates a plurality of the set brightness maps, each of the set brightness maps being generated for one of a plurality of timings.

4. The information processing device according to claim 3, wherein
   in the acquisition of the set brightness information, the at least one processor acquires the set brightness information corresponding to the position of the light-emission device based on (i) a set brightness map regarded as appropriate from among the set brightness maps each being generated for one of the plurality of timings and (ii) the position of the light-emission device.

5. The information processing device according to claim 3, wherein
   in the acquisition of the set brightness information, the at least one processor acquires, based on the set brightness map in movement of the light-emission device, set brightness information corresponding to a position of the light-emission device after movement.

6. The information processing device according to claim 3, wherein
   the light-emission device is one or more light-emission devices, and
   in the acquisition of the set brightness information, when a number of the one or more light-emission devices is changed, the at least one processor generates the set brightness map based on a position of each of the one or more light-emission devices after the change.

7. The information processing device according to claim 1, further comprising:
   a plurality of cameras, wherein
   the at least one processor
      detects, from each of the picture images acquired by the plurality of cameras, light emitted by the light-emission device, and
      acquires the set brightness information based on brightness of the detected light emitted by the light-emission device.

8. The information processing device according to claim 1, wherein
   upon the light-emission device emitting light at a brightness of the set brightness information transmitted to the light-emission device, the at least one processor receives, from the light-emission device, information to the effect that light is emitted at the brightness of the set brightness information.

9. An information processing method for an information processing device, the method comprising:
  acquiring a picture image imaged by a camera;
  from the acquired picture image, detecting light emitted by a light-emission device and acquiring a position of the light in the picture image;
  acquiring, based on (i) brightness of the detected light emitted by the light-emission device, (ii) the acquired position of the light, and (iii) a pre-generated set brightness map indicating set brightness information for each of regions in the picture image that are divisions having a predetermined shape that is previously set, set brightness information indicating an appropriate brightness at the position for light to be emitted by the light-emission device; and
  transmitting the acquired set brightness information to the light-emission device.

10. The information processing method according to claim 9, wherein
  storing the acquired set brightness information in a memory.

11. The information processing method according to claim 9, wherein
  the acquiring of the set brightness information includes generating a plurality of the set brightness maps, each of the set brightness maps being generated for one of a plurality of timings.

12. The information processing method according to claim 11, wherein
  the acquiring of the set brightness information includes acquiring the set brightness information corresponding to the position of the light-emission device based on (i) a set brightness map regarded as appropriate from among the set brightness maps each being generated for one of the plurality of timings and (ii) the position of the light-emission device.

13. The information processing method according to claim 11, wherein
  the acquiring of the set brightness information includes acquiring, based on the set brightness map in movement of the light-emission device, set brightness information corresponding to a position of the light-emission device after movement.

14. The information processing method according to claim 11, wherein
  the light-emission device is one or more light-emission devices, and
  the acquiring of the set brightness information includes generating, when a number of the one or more light-emission devices is changed, the set brightness map based on a position of each of the one or more light-emission devices after the change.

15. The information processing method according to claim 9, wherein
  the information processing device further comprises a plurality of cameras,
  the method further comprises:
    detecting, from each of the picture images acquired by the plurality of cameras, light emitted by the light-emission device, and
    acquiring the set brightness information based on brightness of the detected light emitted by the light-emission device.

16. The information processing method according to claim 9, further comprising:
  upon the light-emission device emitting light at a brightness of the set brightness information transmitted to the light-emission device, receiving, from the light-emission device, information to the effect that light is emitted at the brightness of the set brightness information.

17. A non-transitory computer-readable recording medium recording a program capable of execution by at least one processor of an information processing device, the program causing the at least one processor to:
  acquire a picture image imaged by a camera;
  from the acquired picture image, detect light emitted by a light-emission device and acquire a position of the light in the picture image;
  acquire, based on (i) brightness of the detected light emitted by the light-emission device, (ii) the acquired position of the light, and (iii) a pre-generated set brightness map indicating set brightness information for each of regions in the picture image that are divisions having a predetermined shape that is previously set, set brightness information indicating an appropriate brightness at the position for light to be emitted by the light-emission device; and
  transmit the acquired set brightness information to the light-emission device.

* * * * *